(12) United States Patent
Zhang et al.

(10) Patent No.: US 10,193,173 B2
(45) Date of Patent: Jan. 29, 2019

(54) ELECTROCHEMICAL HYDROGEN SENSOR FOR GLOBAL/LOCAL HYDROGEN STARVATION DETECTION IN PEM FUEL CELLS

(71) Applicant: GM Global Technology Operations LLC, Detroit, MI (US)

(72) Inventors: Jingxin Zhang, Novi, MI (US); Balasubramanian Lakshmanan, Rochester Hills, MI (US); Manish Sinha, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 446 days.

(21) Appl. No.: 14/804,706

(22) Filed: Jul. 21, 2015

(65) Prior Publication Data

US 2017/0025692 A1    Jan. 26, 2017

(51) Int. Cl.
| | |
|---|---|
| *H01M 8/04* | (2016.01) |
| *H01M 8/06* | (2016.01) |
| *G01N 27/403* | (2006.01) |
| *H01M 8/0444* | (2016.01) |
| *H01M 8/04858* | (2016.01) |
| *H01M 8/0656* | (2016.01) |
| *H01M 8/04791* | (2016.01) |

(52) U.S. Cl.
CPC ... *H01M 8/04447* (2013.01); *H01M 8/04798* (2013.01); *H01M 8/04873* (2013.01); *H01M 8/0656* (2013.01)

(58) Field of Classification Search
CPC ............ H01M 8/04447; H01M 8/0606; G01N 27/407
See application file for complete search history.

(56) References Cited

U.S. PATENT DOCUMENTS

| | | | |
|---|---|---|---|
| 7,829,236 B2 | 11/2010 | Desouza | |
| 2003/0141188 A1* | 7/2003 | Imamura | G01N 27/406 204/424 |

(Continued)

FOREIGN PATENT DOCUMENTS

| | | |
|---|---|---|
| CN | 1864292 A | 11/2006 |
| CN | 102714325 A | 10/2012 |

(Continued)

*Primary Examiner* — Stewart A Fraser
*Assistant Examiner* — Rachel L Zhang
(74) *Attorney, Agent, or Firm* — Quinn IP Law

(57) ABSTRACT

A fuel cell stack hydrogen starvation detection device, a fuel cell system and a method of operating a fuel cell stack to protect it from hydrogen starvation conditions. In one particular form, the fuel cell system includes a stack of fuel cells, a controller and a detection device made up of one or more sensors that can compare a reference signal corresponding to the presence of substantially pure hydrogen to a signal that corresponds to a local hydrogen value within a single fuel cell within the stack or across multiple fuel cells within the stack. In this way, the detection device promptly provides indicia of a hydrogen starvation condition within the cell or stack without the need for conventional cell voltage monitoring. The detected hydrogen starvation condition may be presented as a warning signal to alert a user that such a condition may be present, as well as to the controller for modification of the stack operation.

20 Claims, 4 Drawing Sheets

(56) References Cited

U.S. PATENT DOCUMENTS

2007/0134527 A1* 6/2007 Desouza ........... H01M 8/04291
                                                      429/450
2012/0321916 A1* 12/2012 Zaffou .............. H01M 8/04597
                                                        429/9

FOREIGN PATENT DOCUMENTS

| | | |
|---|---|---|
| JP | 2008010219 A | 1/2008 |
| JP | 2013257183 A | 12/2013 |
| JP | 2014026740 A | 2/2014 |

\* cited by examiner

ELECTROCHEMICAL HYDROGEN SENSOR FOR GLOBAL/LOCAL HYDROGEN STARVATION DETECTION IN PEM FUEL CELLS

The present disclosure relates in general to the detection of hydrogen concentration changes in a fuel cell stack as a way to prevent or reduce the impact of hydrogen starvation and cell reversal that would otherwise lead to component corrosion, and in particular to the use of a sensors to detect comparative reactant flows as a way to identify the onset of such hydrogen starvation conditions.

BACKGROUND

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources for propulsion and related motive applications. In a typical fuel cell—such as a proton exchange membrane or polymer electrolyte membrane (in either event, PEM) fuel cell—a pair of catalyzed electrodes are separated by an ion-transmissive electrolyte layer (such as Nafion™) such that together these three layers form what is commonly referred to as a membrane electrode assembly (MEA). A typical catalyst loading on the anode and cathode is about 0.05 to 0.4 mg of platinum (Pt) per square centimeter of support surface area (such as a porous carbon-based mat). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack. It will be appreciated by those skilled in the art that within the present context, any such arrangement of numerous individual cells arranged to increase the overall electrical voltage or current output are deemed to define a stack, even in situations where such precise stacked arrangement of the cells is not readily apparent.

Due to factors such as flooding or ice blockage in the diffusion media or flow channels, as well as $H_2$ maldistribution within or across the MEA, some of the cells within a fuel cell stack may experience a reduced supply of $H_2$ to the anode; this may occur during either startup or normal operation, and in extreme examples, the supply may be cut off altogether. A global $H_2$ starvation in the anode (where the $H_2$ supply is completely cut off) leads to a phenomenon known as cell reversal where the anode is polarized to a potential much higher than the cathode. When a small portion of the anode is cut off from the $H_2$ supply, the portion of the cathode that is starved of $H_2$ experience voltage potentials that are higher than the oxidation threshold of certain key fuel cell components, such as the carbon that makes up the catalyst support layer. This in turn leads to carbon corrosion and a related performance loss or even electrical shorting in the effected cell.

Efforts to meliorate the effects of anode starvation and subsequent cell reversal have not been satisfactory. In one such effort, cell voltage monitoring (CVM) is used as a way to monitor the cell voltage change. Unfortunately, this monitoring only provides indicia of a hydrogen shortage event that has already developed within the stack. Moreover, placing CVM on every cell in the stack is costly. Another such effort may involve a catalyst that promotes preferential oxygen evolution reactions as a way to suppress competing carbon corrosion reactions; graphitized support strategies alone do not sufficiently reduce carbon corrosion rates under either global or localized $H_2$ starvation issues that frequently accompany fuel cell system startup, shutdown, transient or flow blockage operational conditions.

SUMMARY OF THE DISCLOSURE

The present inventors have recognized that there is a need for promptly detecting the $H_2$ concentration change when starvation starts to develop within a fuel cell system as a way to prevent cell reversal and related corrosion-promoting activity.

According to one aspect of the present invention, a hydrogen starvation detection device for use in a fuel cell system is disclosed. The detection device includes a reaction generator in the form of a dynamic hydrogen electrode (i.e., first electrode) that is coupled to one or more other electrodes within the same or another sensor such that a comparison is made between the generated reference signal of the first electrode and the received signal from the other electrode or electrodes. The first electrode is coupled to a voltage source such that it is capable of generating a first signal that corresponds to a substantially pure concentration of hydrogen that is produced by a hydrogen evolution reaction (HER), while a second electrode is configured to receive a second signal that corresponds to local hydrogen concentration within a flowpath such that the first and second signals may be compared in order to provide indicia of a hydrogen starvation condition within the stack.

According to another aspect of the present invention, a fuel cell system includes a stack of fuel cells, a controller and a detection device made up of one or more sensors such that at least one of the sensors (or a part thereof) acts as a reaction generator of a substantially pure reference hydrogen value that can be compared to a local hydrogen value that is sampled by a second sensor (or another part from within the same sensor). In this way, indicia of a hydrogen starvation condition within the stack may be promptly presented to (or acted upon by) the controller for one or more of alerting or stack operational condition modifications.

According to yet another aspect of the present invention, a method of protecting a fuel cell stack made up of numerous fuel cells is disclosed. In the method, a dynamic hydrogen electrode that acts as a reaction generator is operated to promote at least one of a hydrogen evolution reaction (which corresponds to a substantially pure concentration of hydrogen) and an oxygen evolution reaction such that this reference-like signal can be compared to other signals acquired by one or more electrodes within this or another sensor (that acquires a second signal that corresponds to local hydrogen concentration). In this way, the comparative signal (or signals) generated within the sensor's electrodes is correlated to the presence of a hydrogen starvation condition within the cell or stack such that it may be used by a controller to adjust operation of the stack to reduce a hydrogen starvation condition that may arise out of a maldistribution of hydrogen in the cells or stack.

BRIEF DESCRIPTION OF THE FIGURES

The following detailed description of the preferred embodiments of the present invention can be best understood when read in conjunction with the following drawings, where like structure is indicated with like reference numerals and in which the various components of the drawings are not necessarily illustrated to scale:

FIG. 2B shows the global anode starvation condition.

DETAILED DESCRIPTION OF THE PREFERRED EMBODIMENTS

Figure 1A:
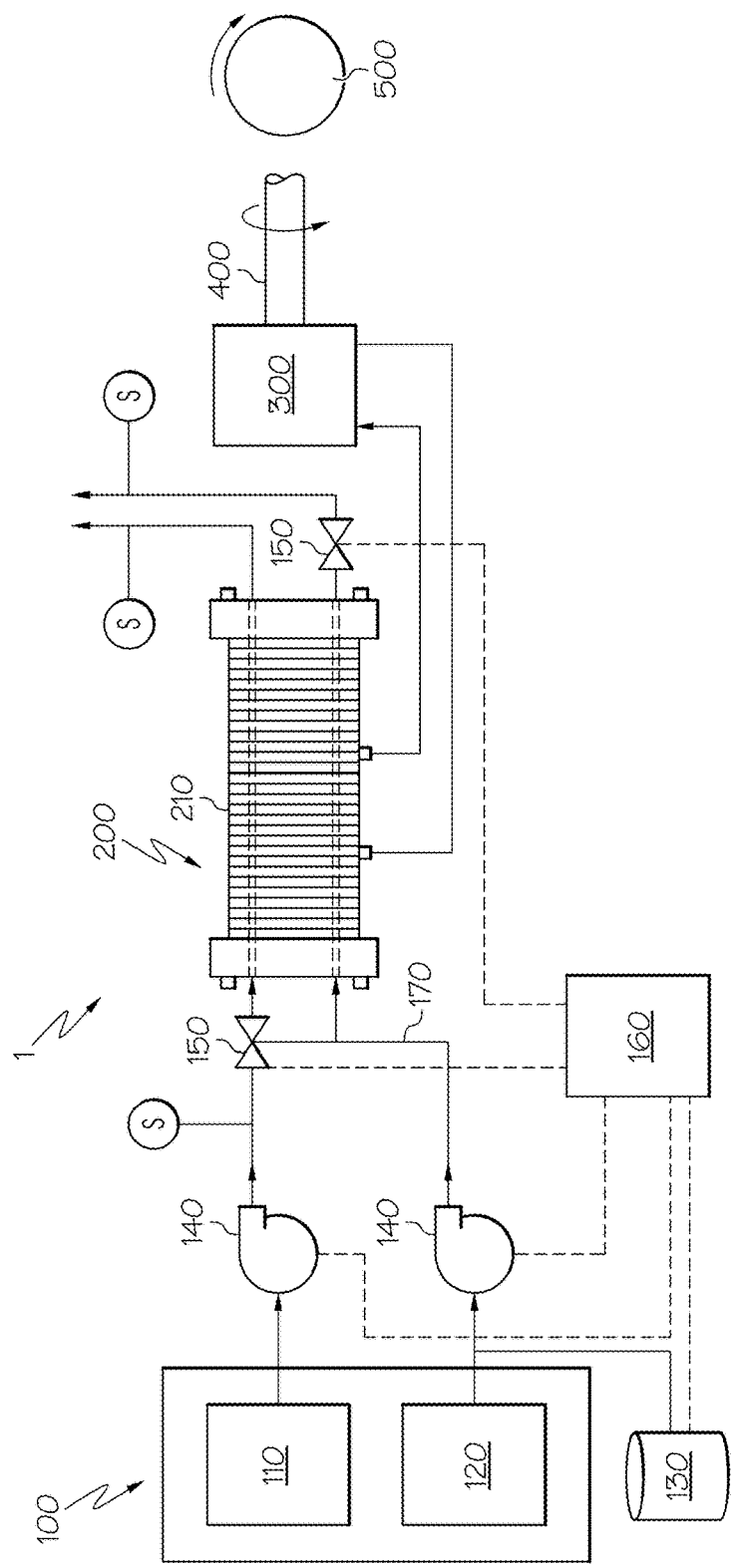
FIG. 1A shows a block diagram of a fuel cell system configured for vehicular application.
Figure 1B:
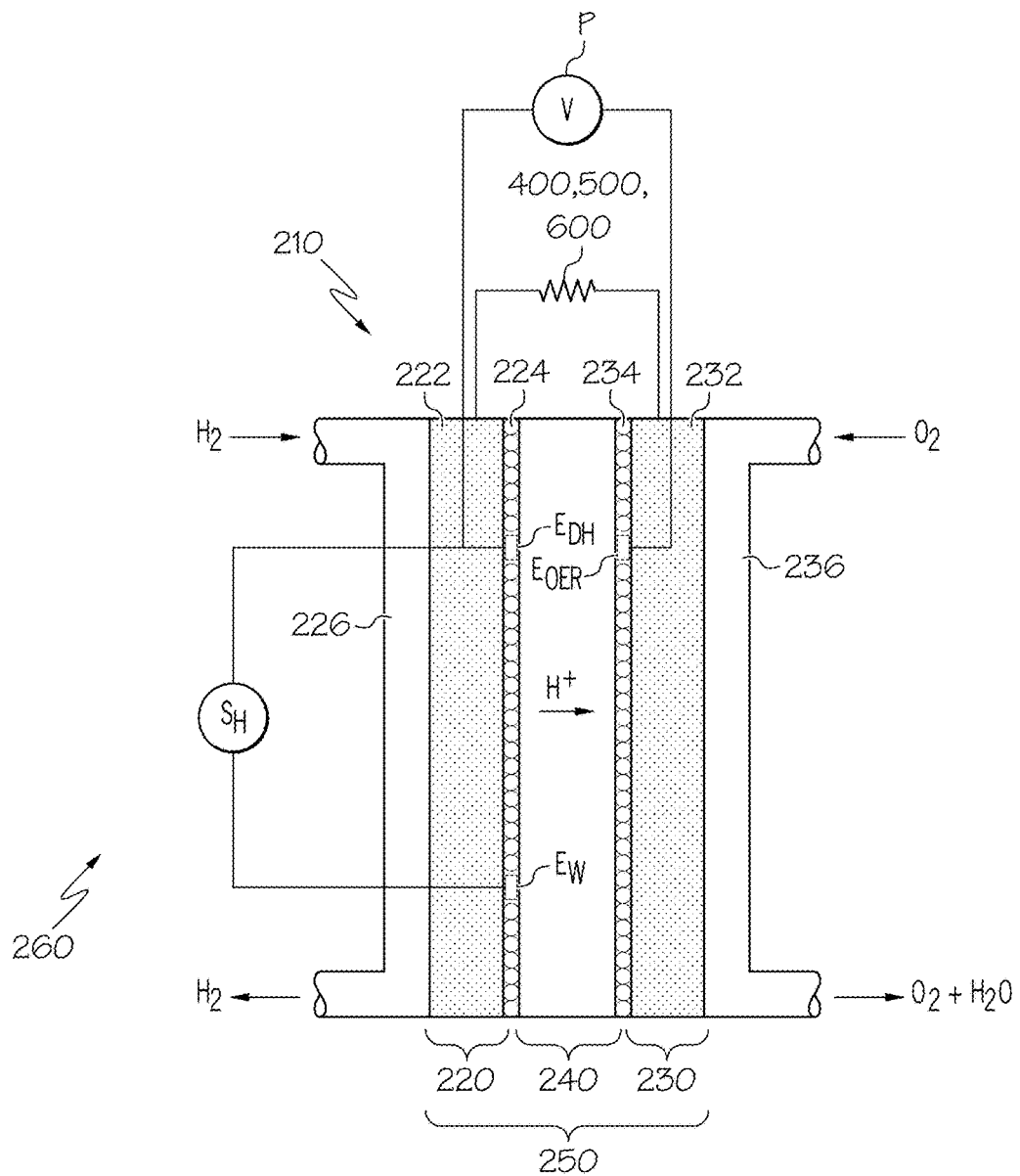
FIG. 1B shows a vertical sectional view of a simplified representative fuel cell from the system of FIG. 1A.

Referring first to FIGS. 1A and 1B, a block diagram of a notional fuel cell system (FIG. 1A), as well as an individual fuel cell (FIG. 1B) are shown. Mobile fuel cell system 1—which may be operated in a manner consistent with the embodiments of the present invention—includes a reactant delivery system 100 (made up of a fuel (i.e., first reactant) source 110 (such as a hydrogen tank) and an oxygen (i.e., second reactant) source 120 (which in one preferred form is ambient air), fuel cell stack 200 and a load in the form of an electric battery or motor 300, drivetrain 400 and one or more motive devices 500, the last shown notionally as a wheel. In configurations where the load 300 is a motor, it is used to convert the electric current coming from the stack 200 into mechanical power such as rotating shaft power that can be used to operate the drivetrain 400 and wheels 500 in a manner known to those skilled in the art. Within stack 200, numerous individual fuel cells 210 are shown serially connected. As can be seen, the delivery of the reactants—as well as that of ancillary fluids, such as those used for cooling or other heat transfer—is preferably achieved by dedicated circuits that include suitably-configured conduit 170, and corresponding pumps 140 and valves 150. As will be appreciated by those skilled in the art, pumps 140 may be optional in configurations where the reactants being from their respective source are already in pressurized form, and that either variant is within the scope of the present invention. Although not shown, other fuel delivery and fuel processing systems are available for use with system 1. For example, there could be, in addition to a fuel source 110 and oxygen source 120, a water source (not shown) that could be used for (among other things) stack 200 cooling.

The electrical current being generated by the fuel cells 210 of the stack 200 may be used to provide power to the pumps 140 and related equipment, as well as for creature comfort apparatus (such as air conditioners, heaters, window defrosters, powered seats) or the like. Furthermore, while the present system 1 is shown for mobile (such as vehicular) applications, it will be appreciated by those skilled in the art that the use of the fuel cells 210, their respective stacks 200 and the ancillary equipment is equally applicable to stationary applications. In the present context, the stack ancillary equipment is that used to provide balance of plant (BOP) operation, and may include the parasitic devices discussed herein, as well as other components that derive their source of electric current from the stack 200. In one part of shutting down the stack 200 in a manner consistent with the present disclosure, the electric current supplied by the stack 200 is preferably reduced to a level that substantially coincides with an amount needed to operate such ancillary equipment.

Methods and systems in accordance with the invention may be performed by a computer-based controller 160 (also referred to as a programmable control device or electronic control unit) that is capable of executing instructions organized into one or more program modules that are made up of dedicated hardware devices and corresponding software. Instructions for implementing any of the system 1 manipulation functions in accordance with the invention (such as opening or closing valves, turning pumps or compressors on or off (as well as speeding them up or down) and conveying sensed data and diagnostic function information) may be tangibly embodied in any suitably-configured embodiments of the various devices or components that make up the controller 160, including being placed resident on a memory portion thereof. Referring with particularity to FIG. 1A, the connections depicted between controller 160 and the various components that make up fuel cell system 1 indicates that the operation can be made to change through instructions received from the controller 160. One such component that is cooperative with controller 160 is a purging or inerting fluid introduction device 130 (shown presently as a tank or related fluid container) that can be activated upon suitable signal that one or more reactant flowpaths are facing a hydrogen starvation condition.

In a preferred form, controller 160 is configured as automated data processing equipment, such as that associated with a digital computer. In such case, it includes one or more of an input, an output, a processing unit (often referred to as a central processing unit (CPU)) and memory that can temporarily or permanently store such a code, program or algorithm in the controller's memory such that the instructions contained in the code are operated upon by the processing unit based on input data such that output data generated by the code and the processing unit can be conveyed to another program or a user via output. As such, controller 160 becomes particularly-adapted in order to perform at least some of the data acquisition, manipulation or related computational functions needed to provide prompt, efficient response of system 1 in the event that a suitable $H_2$ leakage or related maldistribution condition is present. It will be appreciated by those skilled in the art that computer-executable instructions that embody the calculations discussed elsewhere in this disclosure can be placed within an appropriate location (such as the aforementioned memory) within controller 160 in order to achieve the objectives set forth in the present invention.

In a particular form, the computer-readable program code that contains the algorithms and formulae needed to perform the sensing and controlling functions outlined above can be loaded into suitable portions of controller 160 memory. Such computer-readable program code may also be formed as part of an article of manufacture such that the instructions contained in the code are situated on a magnetically-readable or optically-readable disk or other related non-transitory, machine-readable medium, such as flash memory device, CDs, DVDs, EEPROMs, floppy disks or other such medium capable of storing machine-executable instructions and data structures. Such a medium is capable of being accessed by controller 160 or other electronic device having a processing unit used for interpreting instructions from the computer-readable program code. Together, the processor and any program code configured to be executed by the processor define a means to perform one or more of the control functions discussed herein. As will be understood by those skilled in the computer art, the controller 160 may include additional chipsets, as well as a bus and related wiring for conveying data and related information between its processing unit and other internal devices (such as the aforementioned input, output and memory devices) and external devices (such as the stack 200 and its ancillary equipment). Upon having the program code means loaded into ROM, the controller 160 of system 1 becomes a specific-purpose machine configured to determine proper shutdown sequences in the manner described herein.

As shown with particularity in FIG. 1B, details of each fuel cell 210 are shown. Cell 210 includes portions that correspond to electrodes, notably an anode 220, cathode 230 and an electrolyte layer 240 disposed between the electrodes. Together, the anode 220, cathode 230 and electrolyte layer 240 define the MEA 250. The respective hydrogen and oxygen channels 226, 236 that are used to convey the reactants into and out of cell 210 are also shown. In the present context, the term "portion" is used to describe either those parts of the entire fuel cell stack 200, or those of the individual cells 210 within the stack 200. As such, an $H_2$ starvation or maldistribution condition that takes place in either the cell 210 or stack 200 is meant to cover those circumstances where the reactant being introduced into a respective anode or cathode portion 220, 230 of the cell 210 or stack 200 manifests itself as an $H_2$ concentration change within the anode portion 220 that is in need of correction, and that the context will make it clear as to which of the individual cell 210 or entire stack 200 that such maldistribution applies to. Regardless, either variant is deemed to be within the scope of the present invention.

The anode 220 includes a gas diffusion layer 222 and catalyst layer 224 that are fluidly exposed to the hydrogen channel 226. Likewise, the cathode 230 includes a gas diffusion layer 232 and catalyst layer 234 fluidly connected to the oxygen channel 236. Both of the channels 226, 236 form the part of an anode flowpath and cathode flowpath (both described below) that convey the appropriate reactants to and from their respective anode 220 and cathode 230. Preferably, the gas diffusion layers 222, 232 are porous to allow diffusion of hydrogen and oxygen, as well as the flow of water that forms as a result of the fuel-oxygen reaction. The electrolyte layer 240, shown presently in the form of a proton exchange membrane, allows the ionized hydrogen to flow from the anode 220 to the cathode 230 while inhibiting the passage of electrical current therethrough. In the present context, the reactant flowpaths may include channels formed in bipolar plates (not shown) that are cooperative with the MEAs 250, as well as conduit, manifolds, headers and other delivery mechanisms that are fluidly coupled to fuel and oxygen sources. The discussion of either form of flowpath will be apparent from the context.

During transient fuel cell operations, especially startup and shutdown (the latter of which will be discussed in more detail below), the presence of hydrogen-air interfaces and other conditions (including ice blockage, flooding or the like) may lead to excess potentials that can shorten the life of the carbon within the catalyst layers 224, 234; to prevent or minimize the impact of such condition, inerting and purging equipment (including the fluid introduction device 130 discussed above in conjunction with suitable fluid delivery equipment as discussed below) may be included in system 1.

An electrochemical hydrogen sensor $S_H$ for the anode 220 side of each fuel cell 210 is shown, and includes a pair of electrodes in the form of a dynamic hydrogen electrode $E_{DH}$ (which serves as the aforementioned reaction generator) and a working electrode $E_W$ spaced from one another. Although shown presently as a single sensor, it will be appreciated by those skilled in the art that more than one such hydrogen sensor $S_H$ may be placed in the anode 220 flowpath, depending on the need. In the present context, the sensor $S_H$ differs from conventional sensors (such as sensors S depicted in FIG. 1A) in that it has electrochemical attributes that rely upon an actively-generated signal by the voltage generator (presently shown in the form of a small power source) P that correlates to the substantially pure $H_2$ reference. Likewise, an oxygen generation electrode $E_{OER}$ (which is similar in construction to the dynamic hydrogen electrode $E_{DH}$) is placed within the cathode 230 flowpath; as with the dynamic hydrogen electrode $E_{DH}$ and working electrode $E_W$ mentioned above, multiple oxygen generation electrodes $E_{OER}$ may be spaced along the cathode 230 such that they cooperate with a respective dynamic hydrogen electrode $E_{DH}$ and the voltage generator P to provide measurements of potential across the cell 210.

In particular, the sensor $S_H$ works together with the power source P to define a detection device 260. By using the power source P to drive the HER of Equation 1 below and oxygen evolution reaction (OER)—the choice being dependent upon placement of the dynamic hydrogen electrode $E_{DH}$ within the particular location within the cell 210 or stack 200—a reference signal that corresponds to the substantially pure presence of $H_2$ in the anode 220 can be produced for use by sensor $S_H$ through the dynamic hydrogen electrode $E_{DH}$. Comparison of this signal to the one taken from the working electrode $E_W$ that is exposed to the local $H_2$ concentration elsewhere in the anode 220 can produce very quick, accurate indicia of the local $H_2$ concentration and related $H_2$ starvation condition. While the dynamic electrode $E_{DH}$ needs to be located in the anode 220 side for proper $H_2$ concentration detection, its placement may be either in the inlet or outlet region of the anode 220, and either placement is within the scope of the present invention. In the present context, the local $H_2$ concentration corresponds to the location within the cell 210 or stack 200 immediately adjacent the working electrode $E_W$ such that the signal being picked up corresponds substantially entirely to the $H_2$ concentration in that immediately adjacent region without the influence of other fluid concentrations from other parts of the corresponding cell 210 or stack 200. While other forms of substantially pure $H_2$ generation may be used (such as having a line upstream of the injector that can tap into the hydrogen feedstock in a manner generally similar to that of a conventional $O_2$ sensor that is used in internal combustion engines), the present inventors opted instead for the electrode-based reference generation over concerns that the use of a higher pressure injector-based approach and its consequent impact on voltage would be parasitic. In equation form, the HER is as follows:

$$\text{HER: } 2H^+ + 2e^- \rightarrow H_2 \qquad (1).$$

As discussed below, the use of differential signals allows the electrochemical hydrogen sensor $S_H$ to be able to measure very small change in hydrogen concentration. Moreover, unlike the time delay associated with CVM, the signal indicative of the $H_2$ starvation condition can be acted upon much more promptly once received by the controller 160 so that operating conditions could be adjusted to prevent the further development of $H_2$ starvation and cell 210 reversal. As such, the normally undesired condition that leads to anode 220 $H_2$ starvation can be detected well in advance of any significant performance change of—or harm to—the cells 210 and stack 200. In another form, the electrochemical hydrogen sensor $S_H$ of the present invention may be used to reduce the number of CVM devices in the stack 200. The following table of sensitivity capability of sensor $S_H$ shows representative voltage changes at two different temperatures.

| | Temperature (C.) | |
|---|---|---|
| | 80 | 30 |
| $H_2$ concentration (%) | Voltage change (V) | Voltage change (V) |
| 100 | 0.000 | 0 |
| 80 | 0.003 | 0.003 |
| 60 | 0.008 | 0.007 |
| 50 | 0.011 | 0.009 |
| 30 | 0.018 | 0.016 |
| 10 | 0.035 | 0.030 |
| 5 | 0.046 | 0.039 |
| 0.5 | 0.081 | 0.069 |
| 0.1 | 0.105 | 0.090 |
| 0.05 | 0.116 | 0.099 |
| 0.01 | 0.140 | 0.120 |

This table shows the expected voltage signal measured by the sensing electrodes $S_H$, and shows significant sensitivity to relatively minute changes in $H_2$ concentration.

Figure 2A:
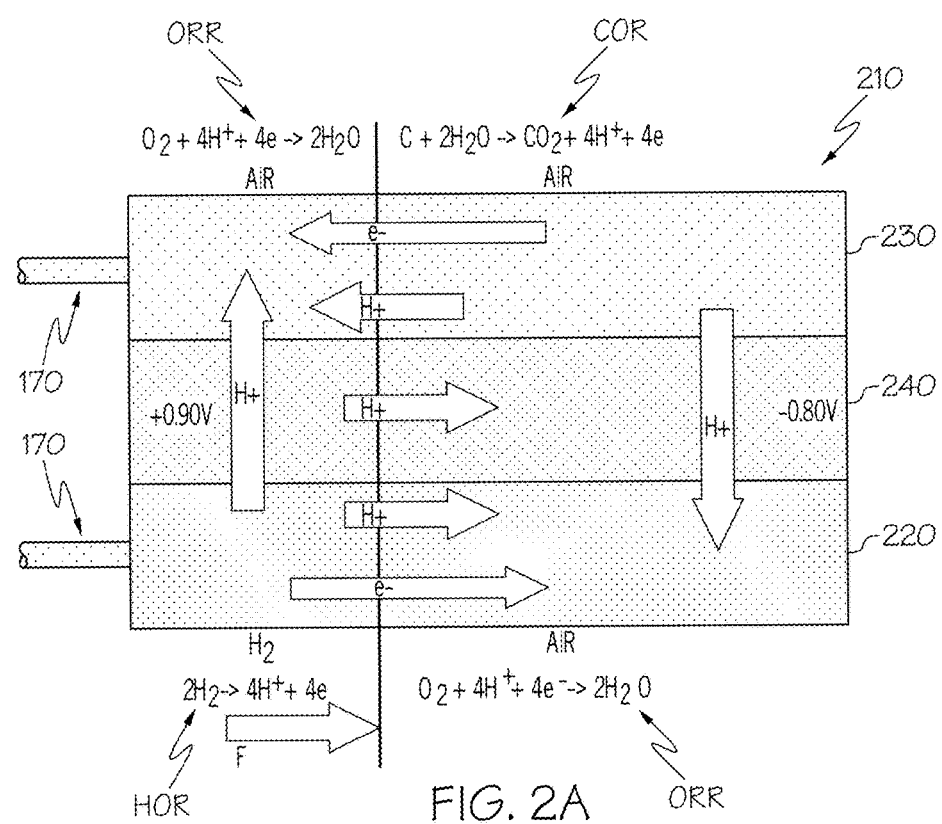
FIGS. 2A and 2B show the various electron and proton flowpaths and fluid regimes across a fuel cell during a fuel cell operational transient, where FIG. 2A specifically shows the cathode carbon corrosion condition
Figure 2B:
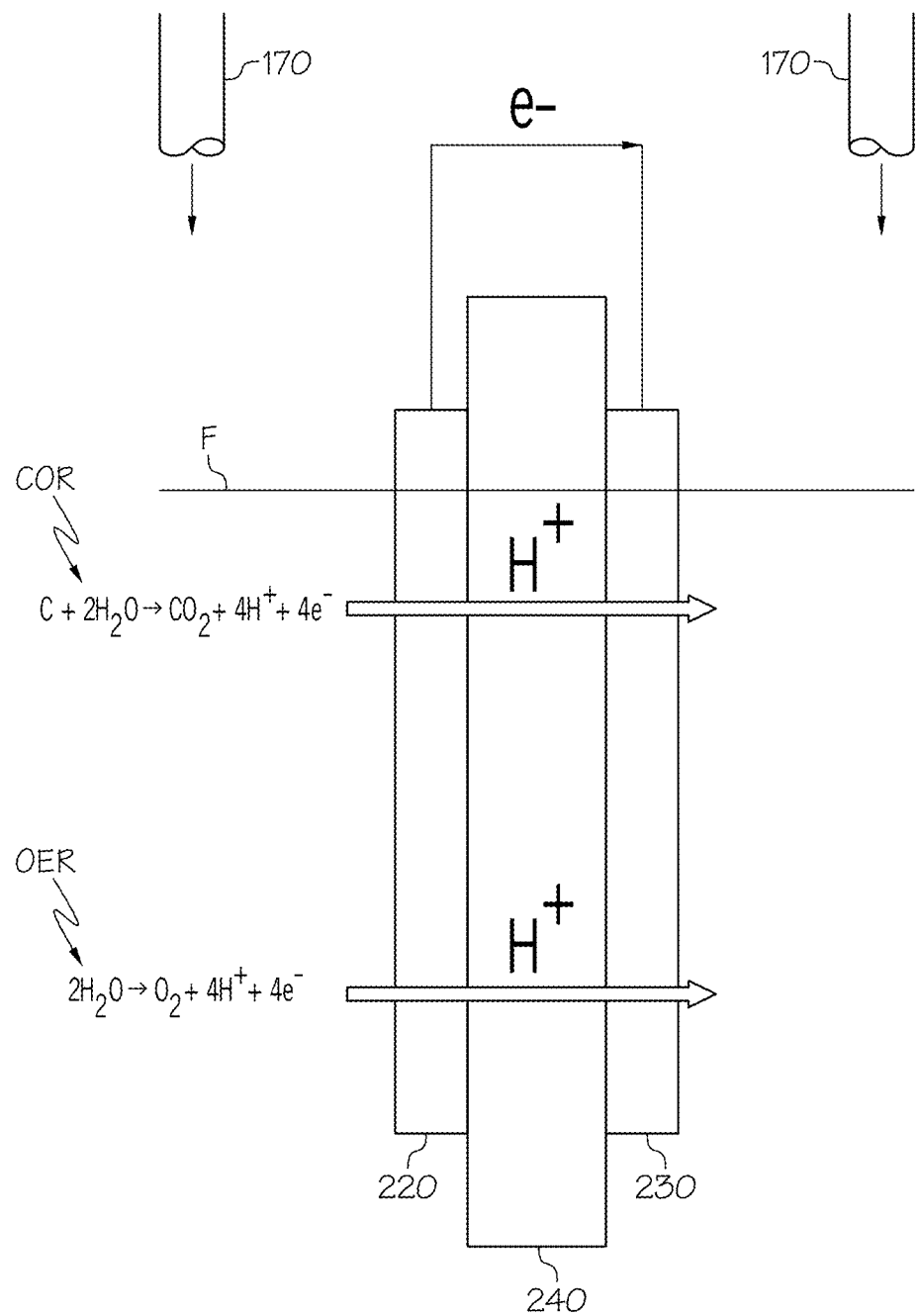

Referring next to FIGS. 2A and 2B, a representation of how various reactions operate to cause voltage variations across the fuel cell 210 during transient conditions are shown. Referring with particularity to FIG. 2A, the effects of startup and shutdown, as well as during operational anomalies where local $H_2$ starvation may be present, are described. As changes in the operating condition of fuel cell 210 occur, the makeup of the fluids in the anode 220 and cathode 230 also change. For example, during steady-state operation, anode 220 has a relatively constant stream of fuel (typically in the form of $H_2$) flowing through it, while cathode 230 has a relatively constant stream of oxygen (typically in the form of air) flowing through it.

During normal operation, the reactants are introduced along the flowpath defined along the length of the cell 210 through suitable conduit 170. The oxidation and reduction reactions take place behind the hydrogen front F (also referred to as a hydrogen-air interface). In them, $H_2$ is oxidized in what is often referred to as a hydrogen oxidation reaction (HOR) at the anode 220; this is shown in equation form as:

$$\text{HOR: } 2H_2 \rightarrow 4H^+ + 4e^- \tag{2}$$

As can be seen by comparing Equations 1 and 2 above, HOR and HER are the reverse reactions of one another. A comparable reduction of the $O_2$ takes place at the cathode 230 (in what is often referred to as an oxygen reduction reaction, ORR). This is shown in equation form as:

$$\text{ORR: } O_2 + 4H^+ + 4e^- \rightarrow 2H_2O \tag{3}$$

Multiple defects during transient flow are believed to be responsible for corrosion of the anode 220 and cathode 230, especially as it relates to the carbon support structure discussed above. Regardless of how it arises, $H_2$ maldistribution leads to off-stoichiometric conditions, which in turn leads to the aforementioned cell reversal, which is accompanied by a significant increase in anode 220 potential that is sufficiently over the thermodynamic equilibrium potential of carbon oxidation (0.207 V). In particular, during transient operation (such as going from steady-state to shutdown), the $H_2$ already present in anode 220 continues to get consumed as the $H_2$ is converted to protons and electrons. This $H_2$ consumption creates a rarefied gas environment that gets filled by incoming air (coming from, for example, an open anode exhaust line), leading to the creation of the front F that forms an electrode potential above the measured electrical voltage. The portion of the fuel cell 210 that is behind the front F under normal open circuit voltage (OCV) might show a measured electrical potential between the anode 220 and cathode 230 of approximately 0.9 volts, while the portion of the fuel cell 210 ahead of the front F might experience an electrical potential of approximately 1.7 volts (including both the measured 0.9 volt OCV plus a reverse polarity negative electrochemical potential drop of 0.8 volts in the membrane 240 due to poor in-plane proton conduction to the region to the right of the front F).

Under these elevated potentials, the portion of the fuel cell 210 ahead of the front F experiences a reduction in available $H_2$. With $O_2$ available to the anode 220, the carbon support in the cathode 230 will be oxidized. Using these notional voltages, the OCV measured at various locations behind (to the left, as shown) the front F without employing the approach of the present invention would produce 0 volts at the anode 220, 0 volts at the membrane 240 and 0.9 volts at the cathode 230 (for a net voltage of 0.9 volts). Ahead (to the right, as shown) of the front F would reveal 0 volts at the anode 220, −0.8 volts at the membrane 240 (due, for example, to inherent internal resistance) and 0.9 volts at the cathode 230 for a net voltage of 1.7 volts; this excess voltage is enough to cause the aforementioned carbon oxidation. By using the approach discussed herein, remedial measures (such as inerting or purging the cathode 230 with the introduction of nitrogen or purging fluid from the fluid introduction device 130) may be promptly implemented to bring the otherwise high OCV down to a level that will ensure that a voltage level sufficient to drive the carbon corrosion reaction is not attained. For example, controller 160 may respond to these lower voltage needs that are picked up by detection device 260 in order to achieve manipulation of various valves, pumps and related reactant delivery equipment (as well as of current-consuming loads) to accept ambient or tank-contained purging or inerting fluid as a way to avoid deleterious cell 210 or stack 200 operating conditions. In one form, the OCV measured at various locations behind the front F after employing the approach of the present invention would indicate 0 volts at the anode 220, 0 volts at the membrane 240 and 0.2 volts (or less) at the cathode 230 (for a net voltage of 0.4 volts or less). Similarly, the same ahead of the front would reveal 0 volts at the anode 220, −0.8 volts at the membrane 240 and 0.2 volts at the cathode 230 for a net voltage of 1.0 volts; thus, the detection of the $H_2$ concentration changes can be used in conjunction with other equipment to prevent the undesired condition of local or global $H_2$ starvation. Because any excess voltage can lead to significant carbon corrosion, any mitigation would preferably bring the terminal voltage below 0.2V so that the local potential in the cathode can be less than 1.0V.

As mentioned above, cell reversal is particularly destructive, as the supply of electrons and protons comes from one or both of the carbon oxidation reaction (COR) and the OER at the anode 220. These are shown in equation form as:

$$\text{OER: } 2H_2O \rightarrow O_2 + 4H^+ + 4e^- \tag{4}$$

$$\text{COR: } C + 2H_2O \rightarrow CO_2 + 4H^+ + 4e^- \tag{5}$$

As is clearly shown in the COR of Equation 5, the cell reversal leads to the consumption of the carbon used to support the anode 220 catalyst (which in one typical form may be platinum, Pt). Likewise, in the case of local $H_2$ starvation in the anode 220 as depicted in FIG. 2A, $O_2$ crossover through membrane 240 is reduced in the region where the $H_2$ is depleted, leading to corrosion of the carbon support of the cathode 230. Either reaction undesirably leads to overall degradation within MEA 250, and can be curtailed by implementing into the fuel cell system 1 the detection device 260 of FIG. 1B.

Referring with particularity to FIG. 2B, similar conditions may give rise to global anode 220 starvation conditions (such as when the substantial entirety of the anode is deprived of hydrogen, as shown). Within the present context, while there is a difference in the mechanisms that produce local $H_2$ starvation of FIG. 2A (where the damage occurs on the carbon support of the corresponding cathode 230) and global $H_2$ starvation of FIG. 2B (where the damage occurs on the carbon support of the anode 220), the resulting desire to reduce or avoid carbon corrosion is the same. In contrast to local $H_2$ starvation (such as depicted in FIG. 2A), in situations involving global $H_2$ starvation, no ORR reaction is present.

Referring back to FIGS. 1A and 1B, the present inventors have discovered that by using sensor $S_H$, the various component leads (or electrodes) may be made to be exposed to different concentrations of $H_2$. Moreover, a comparison of the received concentrations can generate voltage difference due to Nernst reduction/oxidation potential, which states in equation form that:

$$E_{eq} = E_0 + (RT/nF) \times \ln(Ox/Red)$$

where $E_0$ is a thermodynamic value that is quoted versus the standard (i.e., reversible) electrode potential at 25° C., R is the gas constant 8.31451 J/(K mol), T is temperature in Kelvin, n is the number of electrons, F is Faraday's constant 96485 C/mol, and Ox and Red represent the chemical activity of the oxidant and reductant species, respectively. This voltage difference may be exploited by the sensor $S_H$ and the controller 160 as a way to achieve more rapid and accurate indicia of an $H_2$ starvation condition, as well of using inerting or purging fluids (such as from the fluid introduction device 130) as part of a voltage-reducing anode 220 or cathode 230 flooding process.

The choice of placement of the sensor $S_H$ electrodes is a matter of using either the inlet and/or outlet area of an individual cell 210, or selected from cells 210 at different locations within the stack 200; either variant is deemed to be within the scope of the present invention. In one particular form, the two electrodes $E_{DH}$ and $E_W$ may be placed either in cooperation with the inlet or the outlet of the cell 210 being monitored, while in another, they can be placed in cooperation with an anode portion 220 or cathode portion 230 within different cells 210 within the stack 200. One way to ensure substantially pure (i.e., 100%) $H_2$ is to use the dynamic hydrogen electrode $E_{DH}$ in conjunction with the power source P as a way to initiate the HER in the manner discussed above in Equation 1. Likewise, the oxygen generation electrode $E_{OER}$) can be coupled with the cathode 230 of the chosen cell 210 in addition to the power source P in order to facilitate the OER reaction depicted in Equation 4 above.

As mentioned above, the electrochemical hydrogen sensor $S_H$ can be coupled with selected cells 210 in the stack 200. One version of the selected cells 210 can have either blocked flow channels, or one or more channels with reduced cross-section area by reducing the depth of the channel compared to plates in the rest of the stack 200; such modifications could manifest themselves as changes in the size, shape or aspect ratio of the channels that are formed in the bipolar plates (not shown) that are used to deliver the reactants to the cell electrodes. Use of the hydrogen sensor $S_H$ to detect an undesired condition even earlier may be critical in avoiding harmful operational conditions, and may enable corrective measures to be taken sooner.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A fuel cell system hydrogen starvation detection device, the device comprising:
    at least one sensor signally cooperative with at least one of an anode and cathode flowpaths within the system, the sensor comprising:
        a first electrode configured to generate a first signal that corresponds to a substantially pure concentration of hydrogen; and
        a second electrode configured to receive a second signal that corresponds to local hydrogen concentration within the anode flowpath such that a comparison of the first and second signals provides indicia to a controller of a hydrogen starvation condition within a fuel cell stack; and
    a voltage source cooperative with the first electrode, the voltage source configured to provide a voltage sufficient to promote at least one reaction that generates the substantially pure concentration of hydrogen within the cell.

2. The device of claim 1, wherein the first electrode is cooperative with the anode flowpath to measure the first signal based on a hydrogen evolution reaction that takes place within the anode flowpath.

3. The device of claim 1, wherein the first electrode is cooperative with a third electrode corresponding to the cathode flowpath to measure the first signal based on an oxygen evolution reaction that takes place within the cathode flowpath.

4. The device of claim 1, wherein the voltage source is configured to promote a hydrogen evolution reaction within the anode flowpath.

5. The device of claim 1, wherein the voltage source is configured to promote an oxygen evolution reaction within the cathode flowpath.

6. A fuel cell system comprising:
a stack of fuel cells, each comprising an anode, a cathode, a membrane disposed between the anode and cathode and flowpaths configured to convey respective reactants thereto;
a controller cooperative with the stack;
at least one sensor signally cooperative with the controller and at least one of the cells within the stack, the sensor comprising:
a first electrode configured to generate a first signal that corresponds to a substantially pure concentration of hydrogen produced through a hydrogen evolution reaction within the anode flowpath; and
a second electrode configured to receive a second signal that corresponds to local hydrogen concentration within the anode flowpath such that a comparison of the first and second signals provides indicia to the controller of a hydrogen starvation condition within the stack; and
a voltage source cooperative with the first electrode, the voltage source configured to provide a voltage sufficient to promote at least one reaction that generates the substantially pure concentration of hydrogen.

7. The system of claim 6, further comprising a fluid introduction device that is in selective fluid cooperation with at least one of the anode and cathode flowpath such that upon operation of the controller in response to the comparison, a respective one of the flowpaths receives at least one of a purging and an inerting fluid from the fluid introduction device.

8. The system of claim 6, wherein the first electrode is cooperative with the anode flowpath to measure the first signal based on a hydrogen evolution reaction that takes place within the anode flowpath.

9. The system of claim 6, wherein the system does not comprise a cell voltage measurement device.

10. The system of claim 6, wherein the voltage source is configured to promote a hydrogen evolution reaction within the anode flowpath.

11. The system of claim 6, wherein the voltage source is configured to promote an oxygen evolution reaction within the cathode flowpath.

12. The system of claim 6, further comprising:
a fuel source configured to supply fuel to the anode flowpath; and
an oxygen source configured to supply oxygen to the cathode flowpath,
wherein the membrane extends from an anode-side catalyst layer to a cathode-side catalyst layer, the anode defines a portion of the anode flowpath and the cathode defines a portion of the cathode flowpath, the anode includes an anode-side gas diffusion layer, the anode-side gas diffusion layer is porous, the anode-side gas diffusion layer provides for diffusion of a fuel, the anode includes the anode-side catalyst layer, the cathode includes a cathode-side gas diffusion layer, the cathode includes the cathode-side catalyst layer, the cathode-side gas diffusion layer is porous, the cathode-side gas diffusion layer provides for diffusion of oxygen, the first electrode is a dynamic hydrogen electrode, the dynamic hydrogen electrode acts as a reaction generator, the dynamic hydrogen electrode generates the substantially pure concentration of hydrogen within the anode, and the dynamic hydrogen electrode contacts the anode-side catalyst layer of the cell.

13. The system of claim 12, wherein the second electrode is a working electrode, the working electrode contacts the anode-side catalyst layer of the fuel cell, and the working electrode is spaced a distance from the dynamic hydrogen electrode.

14. The system of claim 12, wherein the voltage source is cooperative with a third electrode, the voltage source configured to provide a voltage sufficient to promote a reaction that generates an oxygen evolution reaction, the third electrode is an oxygen generation electrode, and wherein the oxygen generation electrode contacts the cathode-side catalyst layer.

15. The system of claim 12, further comprising a fluid introduction device configured to provide at least one of a purging fluid and an inerting fluid into at least one of the anode flowpath and the cathode flowpath the fluid introduction device configured to provide the at least one of the purging fluid and the inerting fluid in response to the controller receiving the indicia of the hydrogen starvation condition, wherein the fluid introduction device contains the at least one of the purging fluid and the inerting fluid therein prior to providing the at least one of the purging fluid and the inerting fluid into the at least one of the anode flowpath and the cathode flowpath.

16. A method of protecting a fuel cell stack, the method comprising:
having at least one sensor to be signally cooperative with a controller and at least one fuel cell within the stack, the sensor comprising:
a first electrode configured to generate a first signal that corresponds to a substantially pure concentration of hydrogen produced through a hydrogen evolution reaction within at least one reactant flowpath within the stack; and
a second electrode configured to receive a second signal that corresponds to local hydrogen concentration within the at least one reactant flowpath;
using a voltage source to produce the hydrogen evolution reaction or an oxygen evolution reaction;
using a comparison of the first and second signals to provide indicia to the controller of a hydrogen starvation condition within the stack; and
adjusting operation of the stack through the controller to reduce the hydrogen starvation condition.

17. The method of claim 16, wherein detection of the hydrogen starvation condition is performed without using a cell voltage monitoring device.

18. The method of claim 16, wherein the at least one reactant flowpath comprises an anode flowpath.

19. The method of claim 16, wherein the at least one reactant flowpath comprises a plurality of flowpaths comprising an anode flowpath and a cathode flowpath.

20. The method of claim 19, further comprising:
supplying fuel to the anode flowpath from a fuel source;
supplying oxygen to the cathode flowpath from an oxygen source; and
wherein a membrane extends from an anode-side catalyst layer to a cathode-side catalyst layer, the at least one fuel cell includes an anode and a cathode, the anode defines a portion of the anode flowpath and the cathode defines a portion of the cathode flowpath, the anode includes an anode-side gas diffusion layer, the anode-side gas diffusion layer is porous, the anode-side gas diffusion layer provides for diffusion of a fuel, the anode includes the anode-side catalyst layer, the cathode includes a cathode-side gas diffusion layer, the cathode includes a cathode-side catalyst layer, the cathode-side gas diffusion layer is porous, the cathode-side gas diffusion layer provides for diffusion of oxygen, the first electrode is a dynamic hydrogen electrode, the dynamic hydrogen electrode acts as a reaction generator, the dynamic hydrogen electrode generates the substantially pure concentration of hydrogen within the anode, and the dynamic hydrogen electrode contacts the anode-side catalyst layer of the cell.

* * * * *